United States Patent
Zhu et al.

(10) Patent No.: US 11,469,448 B2
(45) Date of Patent: Oct. 11, 2022

(54) ELECTROLYTE ADDITIVE, ELECTROLYTE AND LITHIUM ION SECONDARY BATTERY CONTAINING THE SAME

(71) Applicant: MURATA MANUFACTURING CO., LTD., Kyoto (JP)

(72) Inventors: Cheng Zhu, Shanghai (CN); Jin Pan, Shanghai (CN); Yingtao Chen, Shanghai (CN)

(73) Assignee: Murata Manufacturing Co., Ltd., Kyoto (JP)

( * ) Notice: Subject to any disclaimer, the term of this patent is extended or adjusted under 35 U.S.C. 154(b) by 365 days.

(21) Appl. No.: 16/822,137

(22) Filed: Mar. 18, 2020

(65) Prior Publication Data
US 2020/0313239 A1 Oct. 1, 2020

(30) Foreign Application Priority Data
Mar. 29, 2019 (CN) .......................... 201910252828.9

(51) Int. Cl.
| | |
|---|---|
| H01M 10/0567 | (2010.01) |
| H01M 10/0569 | (2010.01) |
| H01M 10/0525 | (2010.01) |
| H01M 10/26 | (2006.01) |
| H01M 4/131 | (2010.01) |
| H01M 50/46 | (2021.01) |
| H01M 4/02 | (2006.01) |

(52) U.S. Cl.
CPC ....... *H01M 10/0567* (2013.01); *H01M 4/131* (2013.01); *H01M 10/0525* (2013.01); *H01M 10/0569* (2013.01); *H01M 10/26* (2013.01); *H01M 50/46* (2021.01); *H01M 2004/027* (2013.01); *H01M 2004/028* (2013.01)

(58) Field of Classification Search
None
See application file for complete search history.

(56) References Cited

U.S. PATENT DOCUMENTS
2015/0024247 A1  1/2015 Lockett et al.

FOREIGN PATENT DOCUMENTS
JP  2012018860 A  1/2012

OTHER PUBLICATIONS

G. Y. Jung, T. H. Kim, H. B. Lim. Separation of Morpholine, N-Methylmorpholine and N-Methylmorpholine-N-oxide by Indirect UV Absorption Capillary Electrophoresis, Analytical Sciences, Apr. 1996, vol. 12, 367-370.*
T. Husch, N. Duygu Yilmazer, A. Balducci, Martin Korth.Large-scale virtual high-throughput screening for the identification of new battery electrolyte solvents: computing infrastructure and collective properties, Phys. Chem. Chem. Phys., 2015, 17, 3394-3401.*

* cited by examiner

*Primary Examiner* — Carlos Barcena
(74) *Attorney, Agent, or Firm* — K&L Gates LLP

(57) ABSTRACT

The present disclosure provides an electrolyte additive, an electrolyte and a lithium ion secondary battery containing the same. The electrolyte additive has a structure of Formula (1), wherein $R_1$ is hydrogen, a phenyl, a cyano group, an alkyl cyano group or a $C_1$ to $C_6$ alkyls, and each of $R_2$ to $R_5$ is independently selected from hydrogen or a $C_1$ to $C_6$ alkyl. By means of the electrolyte additive, the electrolyte and the lithium ion secondary battery containing the same of the present disclosure, a technical effect of improving electric performance of the lithium ion secondary battery at high voltage and high temperature is achieved.

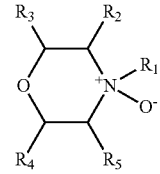

Formula (1)

18 Claims, 1 Drawing Sheet

ELECTROLYTE ADDITIVE, ELECTROLYTE AND LITHIUM ION SECONDARY BATTERY CONTAINING THE SAME

INCORPORATION BY REFERENCE

This application claims the benefit of Chinese Patent Application No. 201910252828.9, filed on Mar. 29, 2019, and titled "Electrolyte Additive, Electrolyte and Lithium Ion Secondary Battery Containing the Same", the entire contents of which are incorporated by reference herein.

TECHNICAL FIELD

The present disclosure relates to the field of lithium ion secondary batteries, and in particular, to an electrolyte additive, an electrolyte and a lithium ion secondary battery containing the same.

BACKGROUND

In recent years, along with continuous development of an electronic technology, the requirements for people to a battery device for supporting energy supply of an electronic device are also continuously increased. Nowadays, batteries capable of storing a high amount of electricity and outputting high power are desired. Traditional lead-acid battery, nickel-metal hydride battery, and the like cannot meet the requirements of mobile equipment, such as a smartphone, and a new-type electronic product of fixed equipment, such as a power storage system. Therefore, a lithium battery has been attracted an extensive attention. During the development of the lithium battery, capacity and performance thereof have been more effectively improved.

At present, electrolyte of an widely used lithium ion secondary battery is mainly composed of a mixed solution using lithium hexafluorophosphate as conductive lithium salt and using cyclic carbonic ester and chain carbonic ester as major solvents. However, the above electrolyte still has many disadvantages, especially in a condition of high voltage, the performance of the lithium ion battery is poor, for example poor high-temperature cycle performance and poor high-temperature storage performance.

When a battery is charged at a high temperature and at a high voltage, a positive electrode material, such as lithium cobaltate and a ternary material, easily results in transition metal being dissolved out, the dissolved-out transition metal may be migrated to a negative electrode so as to be reduced, and then deposited on the surfaces of the negative electrode. The storage performance of the battery is deteriorated on one hand, and gas-producing is seriously occurred; and on the other hand, a positive electrode structure is deteriorated, and the cyclic stability of the battery is reduced. In order to improve the performance of the battery at high temperature and at high voltage, some functional additives are paid more attention to on electrolyte development. For example, alkylene oxides-based additives may perform electric polymerization on the surfaces of negative electrode, the surfaces of negative electrode are passivated and formation and aggravation of lithium dendrites are inhibited, thereby an effect of stabilizing the negative electrode is achieved. An amino group structure of aniline may perform an oxidation-reduction reaction, participate in formation of a solid electrolyte membrane (SEI membrane), and reduce impedance of the SEI membrane. However, the disadvantages of using alkylene oxides-based additives and anilines-based additives in the prior art are that the structures thereof are easily oxidized on surfaces of the positive electrode.

Therefore, an electrolyte capable of improving the membrane formation of fluoroethylene carbonate on the surfaces of negative electrode and enhancing the electric performance of an lithium ion secondary battery at high voltage and at high temperature, and a lithium ion secondary battery containing such electrolyte still need to be developed.

SUMMARY

A main object of the present disclosure is to provide an electrolyte additive, an electrolyte and a lithium ion secondary battery containing the same, so as to solve a problem that electrical performance of the lithium ion secondary battery is poorer at high voltage and at high temperature in the prior art.

For achieving the above object, according to one aspect of the present disclosure, an electrolyte additive is provided, the electrolyte additive has a structure of Formula (1):

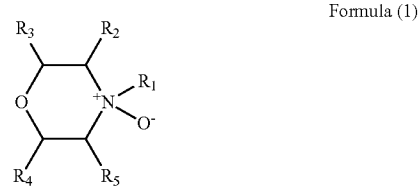

Formula (1)

wherein $R_1$ is hydrogen, a phenyl, a cyano group, an alkyl cyano group or a $C_1$ to $C_6$ alkyl, and each of $R_2$ to $R_5$ is independently selected from hydrogen or a $C_1$ to $C_6$ alkyl.

Further, in the above electrolyte additive, the electrolyte additive comprises a compound with a structure of Formula (1):

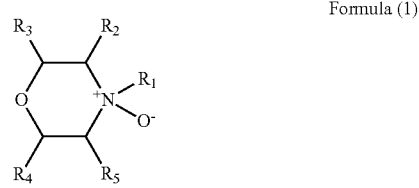

Formula (1)

wherein $R_1$ is hydrogen, a phenyl, a cyano group, a alkyl cyano group or a $C_1$ to $C_6$ alkyl, and each of $R_2$ to $R_5$ is hydrogen.

Further, in the above electrolyte additive, the electrolyte additive comprises a compound with a structure of Formula (1):

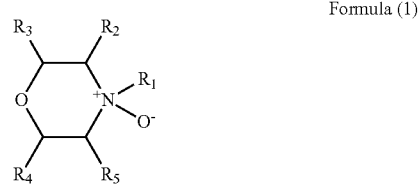

Formula (1)

wherein $R_1$ is a phenyl or a $C_1$ to $C_4$ alkyl, and each of $R_2$ to $R_5$ is hydrogen.

According to another aspect of the present disclosure, an electrolyte is provided, and the electrolyte comprises an organic solvent, a lithium salt and the electrolyte additive as described above.

Further, in the above electrolyte, an amount of the electrolyte additive ranges from about 0.2 to about 3 parts by weight, based on 100 parts by weight of the organic solvent and the lithium salt.

Further, in the above electrolyte, an amount of the organic solvent ranges from about 80 to about 90 parts by weight, based on 100 parts by weight of the organic solvent and the lithium salt t.

Further, in the above electrolyte, an amount of the lithium salt ranges from about 10 to about 20 parts by weight, based on 100 parts by weight of the organic solvent and the lithium salt.

Further, in the above electrolyte, the organic solvent is selected from a group consisting of ethylene carbonate, propylene carbonate, butylene carbonate, fluoroethylene carbonate, diethyl carbonate, dipropyl carbonate, ethyl methyl carbonate, carbonic acid ethylene ester, dimethyl carbonate, or any combination thereof.

Further, in the above electrolyte, the lithium salt is selected from a group consisting of LiCl, LiBr, $LiPF_6$, $LiBF_4$, LiAsFe, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, or any combination thereof.

According to the other aspect of the present disclosure, a lithium ion secondary battery is provided, and the lithium ion secondary battery comprises a positive electrode, a negative electrode, a separator, and the electrolyte as described above.

By using the electrolyte additive, the electrolyte and the lithium ion secondary battery containing the same of the present disclosure, a technical effect of improving electric performance of the lithium ion secondary battery at high voltage and at high temperature is achieved.

DETAILED DESCRIPTION OF THE EMBODIMENTS

Figure 1:
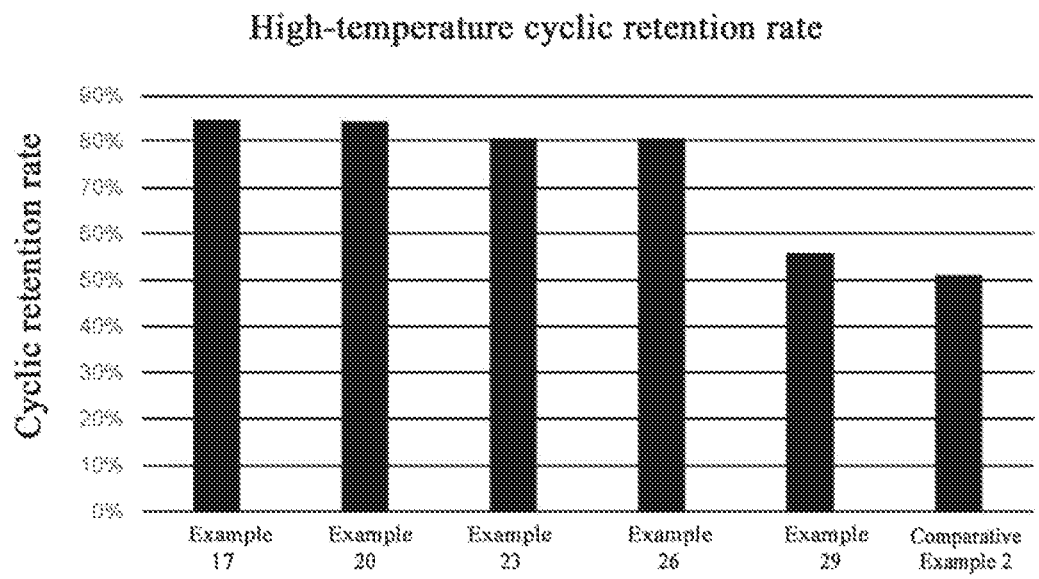
FIG. 1 shows the experimental results of cyclic retention rate of some examples and comparative example 2.

It is noted that embodiments of the disclosure and features of the embodiments may be mutually combined without departing from the spirit of the disclosure. The disclosure is described in detail in combination with the embodiments below. The following embodiments are only exemplary, and are not intend to limit a scope of protection of the disclosure.

As described in the background, an alkylene oxide-based additive or an aniline-based additive is generally added into an electrolyte additive of a lithium ion secondary battery in prior art, so as to improve the membrane formation of fluoroethylene carbonate on the surfaces of negative electrode. However, the method still may not solve problems that the performance of lithium ion secondary battery is poor at high voltage and poor electric performance of lithium ion secondary battery at high temperature. As to the problems in the prior art, a typical embodiment of the present disclosure provides an electrolyte additive, the electrolyte additive has a structure of Formula (1):

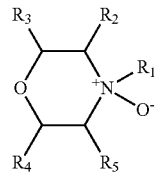

Formula (1)

wherein $R_1$ is hydrogen, a phenyl, a cyano group, an alkyl cyano group or a $C_1$ to $C_6$ alkyl, and each of $R_2$ to $R_5$ is independently selected from hydrogen or a $C_1$ to $C_6$ alkyl.

After a larger number of experiments were performed, the inventors of the present disclosure surprisingly found that one O atom in dioxane for forming the solid electrolyte membrane in prior art may be replaced by an N atom, so that a morpholine structure is formed, and a solid electrolyte membrane is formed on the basis of the morpholine structure. The morpholine structure has an alkylene oxide-like structure, and due to a ring structure thereof having an N atom, it also has properties of an amino group. However, because the N atom in the morpholine structure has a lone electron pair, while a compound containing the morpholine structure is used as the electrolyte additive, oxidative decomposition easily occurs to reduce an electric potential. Therefore, based on the morpholine structure, the inventors modify it to form the structure of Formula (1), in the compound with the structure of Formula (1), the nitrogen atom in a morpholine ring is oxidized to form an inner salt structure of N-morpholine oxide, the lone electron pair on the N atom in the inner salt of the morpholine is bonded with oxygen, and the lone electron pair is removed, thereby possibility that the lone electron pair is further oxidized is reduced, and due to the formation of the inner salt, the solubility of the compound of Formula (1) is improved.

Compared with the electrolyte additive in the prior art, the compound of Formula (1) of the present disclosure may effectively improve the stability of the electrolyte, and the compound may form the stable solid electrolyte membrane on the surfaces of a negative electrode after a first charging-discharging cycle of the lithium ion secondary battery, thereby the cyclic stability and high-temperature storage performance of the battery are improved.

In some embodiments of the present disclosure, the electrolyte additive may comprise one of the following substances or any combination thereof: N-oxidized morpholines, N-methyl-morpholine-N-oxide, N-ethyl-morpholine-N-oxide, N-n-propyl-morpholine-N-oxide, N-isopropyl-morpholine-N-oxide, N-n-butyl-morpholine-N-oxide, N-2-isobutyl-morpholine-N-oxide, N-tert-butyl-morpholine-N-oxide, N-n-pentyl-morpholine-N-oxide, N-2-isopentyl-morpholine-N-oxide, N-3-isopentyl-morpholine-N-oxide, N-2-methyl-1-butyl-morpholine-N-oxide, N-3-methyl-1-butyl-morpholine-N-oxide, N-3,3-dimethyl-1-propyl-morpholine-N-oxide, N-n-hexyl-morpholine-N-oxide, N-phenyl-morpholine-N-oxide, 2-methyl-morpholine-N-oxide, N,2-dimethyl-morpholine-N-oxide, N-ethyl-2-methyl-morpholine-N-oxide, N-propyl-2-methyl-morpholine-N-oxide, N-butyl-2-methyl-morpholine-N-oxide, N-pentyl-2-methyl-morpholine-N-oxide, N-Hexyl-2-methyl-morpholine-N-oxide, N-phenyl-2-methyl-morpholine-N-oxide, 2-ethyl-morpholine-N-oxide, N-methyl-2-ethyl-morpholine-N-oxide, N,2-diethyl-morpholine-N-oxide, N-propyl-2-ethyl-morpholine-N-oxide, N-butyl-2-ethyl-morpholine-N-oxide, N-pentyl-2-ethyl-morpholine-N-oxide, N-hexyl-2-ethyl-morpholine-N-oxide, N-phenyl-2-ethyl-morpholine-N-oxide, 2-propyl-morpholine-N-oxide, N-methyl-2-propyl-morpholine-N-oxide, N-ethyl-2-propyl-morpholine-N-oxide, N,2-dipropyl-morpholine-N-oxide, N-butyl-2-propyl-morpholine-N-oxide, N-pentyl-2-propyl-morpholine-N-oxide, N-hexyl-2-propyl-morpholine-N-oxide, N-phenyl-2-propyl-morpholine-N-oxide, 2-butyl-morpholine-N-oxide, N-methyl-2-butyl-morpholine-N-oxide, N-ethyl-2-butyl-morpholine-N-oxide, N-propyl-2-butyl-morpholine-N-oxide, N,2-dibutyl-morpholine-N-oxide, N-pentyl-2-butyl-morpholine-N-oxide, N-hexyl-2-butyl-morpholine-N-oxide, N-phenyl-2-butyl-morpholine-N-oxide, 2-pentyl-morpholine-N-oxide, N-methyl-2-pentyl-morpholine-N-oxide, N-ethyl-2-pentyl-morpholine-N-oxide, N-propyl-2-pentyl-morpholine-N-oxidation, N-butyl-2-pentyl-morpholine-N-oxide, N,2-dipentyl-morpholine-N-oxide, N-hexyl-2-pentyl-morpholine-N-oxide, N-phenyl-2-pentyl-morpholine-N-oxide, 2-hexyl-morpholine-N-oxide, N-methyl-2-hexyl-morpholine-N-oxide, N-ethyl-2-hexyl-morpholine-N-oxide, N-propyl-2-hexyl-morpholine-N-oxide, N-butyl-2-hexyl-morpholine-N-oxide, N-pentyl-2-hexyl-morpholine-N-oxide, N,2-dihexyl-morpholine-N-oxide, N-phenyl-2-hexyl-morpholine-N-oxide, N,2,3-methyl-morpholine-N-oxide, N,2,5-trimethyl-morpholine-N-oxide, N,2,6-methyl-morpholine-N-oxide, N-methyl-2,3-diethyl-morpholine-N-oxide, N-methyl-2,5-diethyl-morpholine-N-oxide, N-methyl-2,6-diethyl-morpholine-N-oxide, N-methyl-2,3-dipropyl-morpholine-N-oxide, N-methyl-2,5-dipropyl-morpholine-N-oxide, N-methyl-2,6-dipropyl-morpholine-N-oxide, N-methyl-2,3-dibutyl-morpholine-N-oxide, N-methyl-2,5-dibutyl-morpholine-N-oxide, N-methyl-2,6-dibutyl-morpholine-N-oxide, N-methyl-2,3-dipentyl-morpholine-N-oxide, N-methyl-2,5-di pentyl-morpholine-N-oxide, N-methyl-2,6-dipentane-morpholine-N-oxide, N-methyl-2,3-dihexyl-morpholine-N-oxide, N-methyl-2,5-dihexyl-morpholine-N-oxide, N-methyl-2,6-dihexyl-morpholine-N-oxide, N,2,3,5-tetramethyl-morpholine-N-oxide, N,2,3,6-tetramethyl-morpholine-N-oxide, N-methyl-2,3,5-triethyl-morpholine-N-oxide, N-methyl-2,3,6-triethyl-morpholine-N-oxide, N-methyl-2,3,5-Tripropyl-morpholine-N-oxide, N-methyl-2,3,6-tipropyl-morpholine-N-oxide, N-methyl-2,3,5-tributyl-morpholine-N-oxide, N-methyl-2,3,6-tributyl-morpholine-N-oxide, N-methyl-2,3,5-tripentyl-morpholine-N-oxide, N-methyl-2,3,6-tripentyl-morpholine-N-oxide, N-methyl-2,3,5-trihexyl-morpholine-N-oxide, N-methyl-2,3,6-trihexyl-morpholine-N-oxide, N,2,3,5,6-pentamethyl-morpholine-N-oxide, N-methyl-2,3,5,6-tetraethyl-morpholine-N-oxide, N-methyl-2,3,5,6-tetrapropyl-morpholine-N-oxide, N-methyl-2,3,5,6-tetrabutyl-morpholine-N-oxide, N-methyl-2,3,5,6-tetrapentyl-morpholine-N-oxide, N-methyl-2,3,5,6-tetrahexyl-morpholine-N-oxide, N-cyano-morpholine-N-oxide, N-cyano-2-methyl-morpholine-N-oxide, N-cyano-2-ethyl-morpholine-N-oxide, N-cyano-2-propyl-morpholine-N-oxide, N-cyano-2-butyl-morpholine-N-oxide, N-cyano-2,3-dimethyl-morpholine-N-oxide, N-cyano-2,5-dimethyl-morpholine-N-oxide, N-cyano-2,6-dimethyl-morpholine-N-oxide, N-cyano-2,3-diethyl-morpholine-N-oxide, N-cyano-2,5-diethyl-morpholine-N-oxide, N-cyano-2,6-diethyl-morpholine-N-oxide, N-methylcyano-morpholine-N-oxide (N-oxidized morpholine-N-acetonitrile), N-methylcyano-2-methyl-morpholine-N-oxide (2-methyl-N-oxidized morpholine-N-acetonitrile), N-methylcyano-2-ethyl-morpholine-N-oxide (2-ethyl-N-oxidized morpholine-N-acetonitrile), N-methylcyano-2-propyl-morpholine-N-oxide (2-propyl-N-oxidized morpholine-N-acetonitrile), N-methylcyano-2-butyl-morpholine-N-oxide (2-butyl-N-oxidized morpholine-N-acetonitrile), N-methylcyano-2,3-dimethyl-morpholine-N-oxide (2,3-dimethyl-N-oxidized morpholine-N-acetonitrile), N-methylcyano-2,5-dimethyl-morpholine-N-oxide (2,5-dimethyl-N-oxidized morpholine-N-acetonitrile), N-methylcyano-2,6-dimethyl-morpholine-N-oxide (2,6-dimethyl-N-oxidized morpholine-N-acetonitrile), N-methylcyano-2,3-diethyl-morpholine-N-oxide (2,3-diethyl-N-oxidized morpholine-N-acetonitrile), N-methylnitrile-2,5-diethyl-morpholine-N-oxide (2,5-diethyl-N-oxidized morpholine-N-acetonitrile), N-methylnitrile-2,6-diethyl-morpholine-N-oxide, N-ethylcyano-morpholine-N-oxide (N-oxidized morpholine-N-propionitrile), N-ethylcyano-2-methyl-morpholine-N-oxide (2-methyl-N-oxidized morpholine-N-propionitrile), N-ethylcyano-2-ethyl-morpholine-N-oxide (2-ethyl-N-oxidized morpholine-N-propionitrile), N-ethylcyano-2-propyl-morpholine-N-oxide (2-propyl-N-oxidized morpholine-N-propionitrile), N-ethylcyano-2-butyl-morpholine-N-oxide (2-butyl-N-oxidized morpholine-N-propionitrile), N-ethylcyano-2,3-dimethyl-morpholine-N-oxide (2,3-dimethyl-N-oxidized morpholine-N-propionitrile), N-ethylcyano-2,5-dimethyl-morpholine-N-oxide (2,5-dimethyl-N-oxidized morpholine-N-propionitrile), N-ethylcyano-2,6-dimethyl-morpholine-N-oxide (2,6-dimethyl-N-oxidized morpholine-N-propionitrile), N-ethylcyano-2,3-diethyl-morpholine-N-oxide (2,3-diethyl-N-oxidized morpholine-N-propionitrile), N-ethylcyano-2,5-diethyl-morpholine-N-oxide (2,5-diethyl-N-oxidized morpholine-N-propionitrile), N-ethylcyano-2,6-diethyl-morpholine-N-oxide (2,6-diethyl-N-oxidized morpholine-N-propionitrile), N-propylcyano-morpholine-N-oxide (N-oxidized morpholine-N-butyronitrile), N-propylcyano-2-methyl-morpholine-N-oxide (2-methyl-N-oxidized morpholine-N-butyronitrile), N-propylcyano-2-ethyl-morpholine-N-oxide (2-ethyl-N-oxidized morpholine-N-butyronitrile), N-propylcyano-2-propyl-morpholine-N-oxide (2-propyl-N-oxidized morpholine-N-butyronitrile), N-propylcyano-2-butyl-morpholine-N-oxide (2-butyl-N-oxidized morpholine-N-butyronitrile), N-propylcyano-2,3-dimethyl-morpholine-N-oxide (2,3-dimethyl-N-oxidized morpholine-N-butyronitrile), N-propylcyano-2,5-dimethyl-morpholine-N-oxide (2,5-dimethyl-N-oxidized morpholine-N-butyronitrile), N-propylcyano-2,6-dimethyl-morpholine-N-oxide (2,6-dimethyl-N-oxidized morpholine-N-butyronitrile), N-propylcyano-2,3-diethyl-morpholine-N-oxide (2,3-diethyl-N-oxidized morpholine-N-butyronitrile), N-propylcyano-2,5-diethyl-morpholine-N-oxide (2,5-diethyl-N-oxidized morpholine-N-butyronitrile), N-propylcyano-2,6-diethyl-morpholine-N-oxide (2,6-diethyl-N-oxidized morpholine-N-butyronitrile).

Preferably, in some embodiments, the electrolyte additive may contain one of the following substances or any combination thereof: N-oxidized morpholine, N-methyl-morpholine-N-oxide, N-ethyl-morpholine-N-oxide, N-propyl-morpholine-N-oxide (e.g. N-n-propyl-morpholine-N-oxide, and N-isopropyl-morpholine-N-oxide), N-butyl-morpholine-N-oxide (e.g. N-n-butyl-morpholine-N-oxide, N-2-isobutyl-morpholine-N-oxide, and N-tert-butyl-morpholine-N-oxide), N-pentyl-morpholine-N-oxide (e.g. N-n-pentyl-morpholine-N-oxide, N-2-isopentyl-morpholine-N-oxide, N-3-isopentyl-morpholine-N-oxide, N-2-methyl-1-butyl-morpholine-N-oxide, N-3-methyl-1-butyl-morpholine-N-oxide, and N-3,3-dimethyl-1-propyl-morpholine-N-oxide), N-hexyl-morpholine-N-oxide (e.g. N-n-hexyl-morpholine-N-oxide), N-phenyl-morpholine-N-oxide.

In a further preferable embodiment, the electrolyte additive may contain one of the following substances or any combination thereof: N-methyl-morpholine-N-oxide, N-ethyl-morpholine-N-oxide, N-propyl-morpholine-N-oxide (e.g. N-n-propyl-morpholine-N-oxide, and N-isopropylmorpholine-N-oxide), N-butyl-morpholine-N-oxide (e.g. N-n-butyl-morpholine-N-oxide, N-2-isobutyl-morpholine-N-oxide, N-tert-butyl-morpholine-N-oxide) or N-phenyl-morpholine-N-oxide.

In another typical embodiment of the present disclosure, an electrolyte is provided, and the electrolyte comprises an organic solvent, a lithium salt and the electrolyte additive as described above. Since the electrolyte additive of the present disclosure is contained, the electrolyte of the present disclosure has higher stability, and while the electrolyte of the present disclosure is used, after a first charging-discharging cycle, a stable solid electrolyte membrane is formed on the surfaces of a negative electrode.

The solid electrolyte membrane formed by polymerizing a compound of Formula (1) of the present disclosure is a good conductor of $Li^+$ ions. Compared with a solid electrolyte membrane in prior art, the solid electrolyte membrane formed by the compound of Formula (1) of the present disclosure is more beneficial to enable $Li^+$ ions to be freely inserted or de-inserted in the surfaces of negative electrode. In addition, the solid electrolyte membrane in the present disclosure is insoluble in organic solvent, and it keeps stable properties during a high-temperature or a high-voltage using period of a battery. Thus problems that battery cyclic performance is reduced because of inserting of solvent molecules, and a battery aging speed is very quick are effectively avoided.

In some embodiments of the present disclosure, in an electrolyte of the present disclosure, an amount of an additive ranges from about 0.2 to about 3 parts by weight, based on 100 parts by weight of an organic solvent and a lithium salt. In the above range, the electrolyte additive may effectively form a solid electrolyte membrane. While the amount of the electrolyte additive is less than about 0.2 parts by weight, the electrolyte additive in the electrolyte is not enough to form the complete solid electrolyte membrane on the surfaces of negative electrode, thereby cyclic performance of a battery is reduced; and while the amount of the additive is higher than about 3 parts by weight, the amount of the electrolyte additive in the electrolyte is excessive, so that a thickness of the solid electrolyte membrane formed on the surfaces of negative electrode is oversized, and inserting and de-inserting efficiency of lithium ions is affected.

In the different embodiments of the present disclosure, according to different combinations of the lithium salt and the organic solvent, a minimum value of the amount of the electrolyte additive in the electrolyte may be greater than about 0.2 parts by weight, about 0.3 parts by weight, about 0.4 parts by weight, about 0.5 parts by weight, about 0.6 parts by weight, about 0.7 parts by weight, about 0.8 parts by weight, about 0.9 parts by weight, about 1.0 parts by weight, about 1.1 parts by weight, about 1.2 parts by weight, about 1.3 parts by weight, about 1.4 parts by weight or about 1.5 parts by weight, based on 100 parts by weight of an organic solvent and a lithium salt. In addition, according to the different combinations of the lithium salt and the organic solvent, a maximum value of the amount of the electrolyte additive in the electrolyte may be less than about 3.0 parts by weight, about 2.9 parts by weight, about 2.8 parts by weight, about 2.7 parts by weight, about 2.6 parts by weight, about 2.5 parts by weight, about 2.4 parts by weight, about 2.3 parts by weight, about 2.2 parts by weight, about 2.1 parts by weight, about 2.0 parts by weight, about 1.9 parts by weight, about 1.8 parts by weight, about 1.7 parts by weight or about 1.6 parts by weight, based on 100 parts by weight of an organic solvent and a lithium salt.

Specifically, the amount of the electrolyte additive in the electrolyte may be within the following range: from about 0.2 parts by weight to about 3.0 parts by weight, from about 0.2 parts by weight to about 2.9 parts by weight, from about 0.3 parts by weight to about 2.8 parts by weight, from about 0.4 parts by weight to about 2.7 parts by weight, from about 0.5 parts by weight to about 2.6 parts by weight, from about 0.6 parts by weight to about 2.5 parts by weight, from about 0.7 parts by weight to about 2.4 parts by weight, from about 0.8 parts by weight to about 2.3 parts by weight, from about 0.9 parts by weight to about 2.2 parts by weight, from about 1.0 parts by weight to about 2.1 parts by weight, from about 1.1 parts by weight to about 2.0 parts by weight, from about 1.2 parts by weight to about 1.9 parts by weight, from about 1.3 parts by weight to about 1.8 parts by weight, from about 1.4 parts by weight to about 1.7 parts by weight, from about 1.5 parts by weight to about 1.6 parts by weight, from about 0.2 parts by weight to about 1.0 parts by weight, from about 0.2 parts by weight to about 1.0 parts by weight, from about 1.0 parts by weight to about 2.0 parts by weight, from about 2.0 parts by weight to about 3.0 parts by weight, from about 1.5 parts by weight to about 2.0 parts by weight, from about 1.5 parts by weight to about 2.5 parts by weight or from about 2.0 parts by weight to about 2.5 parts by weight, based on 100 parts by weight of an organic solvent and a lithium salt.

In some embodiment of the electrolyte of the present disclosure, the amount of the organic solvent ranges from about 80 parts by weight to about 90 parts by weight, based on 100 parts by weight of an organic solvent and a lithium salt. In addition, the amount of the lithium salt ranges from about 10 parts by weight to about 20 parts by weight. In the above range, the lithium salt and the organic solvent may form a non-aqueous electrolyte system well, and after the electrolyte additive of the present disclosure in the amount as described above is added, the formed electrolyte system may form a good solid electrolyte membrane after a first electric cycle. In addition, lithium ions formed in the amount of the lithium salt within the above range may perform inserting and de-inserting in the most effective amount, thereby the cyclic efficiency of the lithium ion secondary battery is improved.

In the present disclosure, the organic solvent of the non-aqueous electrolyte may be any non-aqueous solvents which are used for non-aqueous electrolyte solution so far. Examples of the organic solvent of the non-aqueous electrolyte include but not limited to: linear or cyclic carbonates, such as ethylene carbonate, propylene carbonate, butylene carbonate, diethyl carbonate, dimethyl carbonate, ethyl methyl carbonate, dipropyl carbonate, and fluoroethylene carbonate; ethers, such as 1,2-dimethoxyethane, 1,2-diethoxyethane, Gamma-butyrolactone, tetrahydrofuran, 2-methyltetrahydrofuran, 1,3-dioxolane, 4-methyl-1,3-dioxolane, and diethyl ether; sulfones, such as sulfolane, and methyl sulfolane; nitriles, such as acetonitrile, and propionitrile; and esters, such as acetate, propionate, and butyrate, and the like. These non-aqueous solvents may be separately used or at least two solvents are combined to be used. In some embodiments of the present disclosure, the preferable electrolyte includes ethylene carbonate, propylene carbonate, butylene carbonate, fluoroethylene carbonate, diethyl carbonate, dipropyl carbonate, ethyl methyl carbonate, carbonic acid ethylene ester and/or dimethyl carbonate, and any combination thereof. In a preferable embodiment, at least one carbonic ester is used as the organic solvent of the electrolyte of the present disclosure. In some other preferable embodiments, the above non-aqueous solvents may be arbitrarily used and combined to form the electrolyte solution in accordance with different requirements.

In the present disclosure, no special limitation for the lithium salt component contained in the electrolyte, and the known lithium salt in prior art which may be used for a lithium battery electrolyte may be adopted. The examples of the lithium salt include but not limited to LiCl, LiBr, LiPFe, LiBF$_4$, LiAsFe, LiClO$_4$, LiB(C$_6$H$_5$)$_4$, LiCH$_3$SO$_3$, LiCF$_3$SO$_3$, LiN(SO$_2$CF$_3$)$_2$, LiC(SO$_2$CF$_3$)$_3$, LiAlCl$_4$ and/or LiSiF$_6$, and any combination thereof.

In the other typical embodiment of the present disclosure, a lithium ion secondary battery is provided, and the lithium ion secondary battery includes: a positive electrode, a negative electrode, a separator, and the electrolyte as described above. Since the lithium ion secondary battery of the present disclosure uses the electrolyte as described above, the lithium ion secondary battery has excellent electric performance at high-temperature and at high-voltage.

The positive electrode of the present disclosure includes a positive electrode current collector and a positive electrode active substance layer containing a positive electrode active substance. The positive electrode active substance layer is formed on two surfaces of the positive electrode current collector. Metal foil, such as aluminum foil, nickel foil and stainless steel foil, may be used as the positive electrode current collector.

The positive electrode active substance layer contains one or two or more of positive electrode materials which are used as the positive electrode active substance and are capable of absorbing and releasing lithium ions, and if necessary, other materials may be contained, for example a positive electrode binder and/or a positive electrode conductive agent.

Preferably, the positive electrode material is a lithium-containing compound. Instances of the lithium-containing compound include a lithium-transition metal composite oxide, a lithium-transition metal phosphate compound, and the like. The lithium-transition metal composite oxide is an oxide containing Li and one, or two or more of transition metals which are used as composition elements, and the lithium-transition metal phosphate compound is a phosphate compound containing Li and one, or two or more of transition metals which are used as the composition elements. In such compounds, the transition metal is advantageously any one, or two or more of Co, Ni, Mn, Fe, and the like.

Instances of the lithium-transition metal composite oxide include, for example LiCoO$_2$, LiNiO$_2$, and the like. Instances of the lithium-transition metal phosphate compound include, for example LiFePO$_4$, LiFe$_{1-u}$Mn$_u$PO$_4$ (u is less than 1), and the like.

In addition, the positive electrode material may be, for example any one, or two or more of an oxide, a disulfide, a chalcogen compound, a conductive polymer, and the like. Instances of the oxide include, for example a titanium oxide, a vanadium oxide, manganese dioxide, and the like. Examples of the disulfide include, for example titanium disulfide, molybdenum sulfide, and the like. Instances of the chalcogen compound include, for example niobium selenide, and the like. Instances of the conductive polymer include, for example sulfur, polyaniline, polythiophene, and the like. However, the positive electrode material may be a material different from those mentioned above.

An instance of the positive electrode conductive agent includes a carbon material, for example graphite, carbon black, acetylene black and Ketjen black. These may be separately used, or two or more of them may be mixed for using. It is to be noted that the positive electrode conductive agent may be a metal material, a conductive polymer or an analogue, only if it has electrical conductivity.

Instances of the positive electrode binder include synthetic rubber and a polymer material for example. The synthetic rubber may be styrene butadiene rubber, fluoro-rubber and ethylene-propylene-diene rubber for example, and the polymer material may be polyvinylidene fluoride and polyimide for example. These may be separately used, or two or more of them may be mixed for using.

The negative electrode of the present disclosure includes a negative electrode current collector and a negative electrode active substance layer containing a negative electrode active substance. The negative electrode active substance layer is formed on two surfaces of the negative electrode current collector. A metal foil, such as a copper (Cu) foil, a nickel foil and a stainless steel foil, may be used as the negative electrode current collector.

The negative electrode active substance layer contains a material which is used as the negative electrode active substance and is capable of absorbing and releasing the lithium ions, and may contain another material if necessary, for example a negative electrode binder and/or a negative electrode conductive agent. Details of the negative electrode binder and the negative electrode conductive agent are the same as those of the positive electrode binder and the positive electrode conductive agent for example.

The negative electrode active substance is a carbonaceus material containing graphite. Because the carbonaceus material has a low electric potential while the lithium ions are absorbed, high energy density may be achieved, and battery capacity may be increased. Furthermore, the carbonaceus material also acts as the conductive agent. This type of the carbonaceus material is a material or an analogue obtained by coating natural graphite and artificial graphite for example with amorphous carbon. It is to be noted that a shape of the carbon material is a fiber form, a spherical shape, a granular form, a flake form or a similar shape.

Besides, the negative electrode material may be one, or two or more of easy-graphited carbon, difficult-graphited carbon, a metallic oxide, a polymer compound, and the like. Instances of the metallic oxide include, for example an iron oxide, a ruthenium oxide, a molybdenum oxide, and the like. Instances of the polymer compound include, for example polyacetylene, polyaniline, polypyrrole, and the like. However, the negative electrode material may be another material different from those as described above.

The separator of the present disclosure is used for separating the positive electrode and the negative electrode in the battery, and enabling ions to pass through, at the same time preventing current short circuit caused by contact between the two electrode pieces. The separator may be, for example, a porous membrane formed by synthetic resin, ceramic, or similar substances, and a laminating membrane laminated by two or more porous membranes. Instances of the synthetic resin include, for example polytetrafluoroethylene, polypropylene, polyethylene, and the like.

In the embodiment of the present disclosure, when charging is performed, for example, lithium ions are released from the positive electrode and absorbed in the negative electrode through the non-aqueous electrolyte impregnated onto the separator. When discharging is performed, for example, lithium ions are released from the negative electrode and absorbed in the positive electrode through the non-aqueous electrolyte impregnated onto the separator.

The present disclosure is further described in detail in combination with specific examples below, these examples may not be understood to limit a scope of protection required by the present disclosure.

Preparation of Electrolyte

Example 1

15 g of ethylene carbonate and 70 g of dimethyl carbonate are mixed with 15 g of lithium hexafluorophosphate so as to prepare a base electrolyte. 0.2 g of N-methyl-morpholine-N-oxide is added into the electrolyte. After uniformly stirring, it is used for standby application.

Example 2

15 g of ethylene carbonate and 70 g of dimethyl carbonate are mixed with 15 g of lithium hexafluorophosphate so as to prepare a base electrolyte. 1 g of N-methyl-morpholine-N-oxide is added into the electrolyte. After uniformly stirring, it is used for standby application.

Example 3

15 g of ethylene carbonate and 70 g of dimethyl carbonate are mixed with 15 g of lithium hexafluorophosphate so as to prepare a base electrolyte. 3 g of N-methyl-morpholine-N-oxide is added into the electrolyte. After uniformly stirring, it is used for standby application.

Example 4

15 g of ethylene carbonate and 70 g of dimethyl carbonate are mixed with 15 g of lithium hexafluorophosphate so as to prepare a base electrolyte. 0.2 g of N-ethyl-morpholine-N-oxide is added into the electrolyte. After uniformly stirring, it is used for standby application.

Example 5

15 g of ethylene carbonate and 70 g of dimethyl carbonate are mixed with 15 g of lithium hexafluorophosphate so as to prepare a base electrolyte. 1 g of N-ethyl-morpholine-N-oxide is added into the electrolyte. After uniformly stirring, it is used for standby application.

Example 6

15 g of ethylene carbonate and 70 g of dimethyl carbonate are mixed with 15 g of lithium hexafluorophosphate so as to prepare a base electrolyte. 3 g of N-ethyl-morpholine-N-oxide is added into the electrolyte. After uniformly stirring, it is used for standby application.

Example 7

15 g of ethylene carbonate and 70 g of dimethyl carbonate are mixed with 15 g of lithium hexafluorophosphate so as to prepare a base electrolyte. 0.2 g of N-n-propyl-morpholine-N-oxide is added into the electrolyte. After uniformly stirring, it is used for standby application.

Example 8

15 g of ethylene carbonate and 70 g of dimethyl carbonate are mixed with 15 g of lithium hexafluorophosphate so as to prepare a base electrolyte. 1 g of N-n-propyl-morpholine-N-oxide is added into the electrolyte. After uniformly stirring, it is used for standby application.

Example 9

15 g of ethylene carbonate and 70 g of dimethyl carbonate are mixed with 15 g of lithium hexafluorophosphate so as to prepare a base electrolyte. 3 g of N-n-propyl-morpholine-N-oxide is added into the electrolyte. After uniformly stirring, it is used for standby application.

Example 10

15 g of ethylene carbonate and 70 g of dimethyl carbonate are mixed with 15 g of lithium hexafluorophosphate so as to prepare a base electrolyte. 0.2 g of N-n-butyl-morpholine-N-oxide is added into the electrolyte. After uniformly stirring, it is used for standby application.

Example 11

15 g of ethylene carbonate and 70 g of dimethyl carbonate are mixed with 15 g of lithium hexafluorophosphate so as to prepare a base electrolyte. 1 g of N-n-butyl-morpholine-N-oxide is added into the electrolyte. After uniformly stirring, it is used for standby application.

Example 12

15 g of ethylene carbonate and 70 g of dimethyl carbonate are mixed with 15 g of lithium hexafluorophosphate so as to prepare a base electrolyte. 3 g of N-n-butyl-morpholine-N-oxide is added into the electrolyte. After uniformly stirring, it is used for standby application.

Example 13

15 g of ethylene carbonate and 70 g of dimethyl carbonate are mixed with 15 g of lithium hexafluorophosphate so as to prepare a base electrolyte. 0.2 g of N-phenyl-morpholine-N-oxide is added into the electrolyte. After uniformly stirring, it is used for standby application.

Example 14

15 g of ethylene carbonate and 70 g of dimethyl carbonate are mixed with 15 g of lithium hexafluorophosphate so as to prepare a base electrolyte. 1 g of N-phenyl-morpholine-N-oxide is added into the electrolyte. After uniformly stirring, it is used for standby application.

Example 15

15 g of ethylene carbonate and 70 g of dimethyl carbonate are mixed with 15 g of lithium hexafluorophosphate so as to prepare a base electrolyte. 3 g of N-phenyl-morpholine-N-oxide is added into the electrolyte. After uniformly stirring, it is used for standby application.

Comparative Example 1

15 g of ethylene carbonate and 70 g of dimethyl carbonate are mixed with 15 g of lithium hexafluorophosphate so as to prepare a base electrolyte. Any other additives are not added into the obtained base electrolyte.

Preparation of Battery

Example 16

Preparation of Positive Electrode 92 g of a lithium cobaltate positive electrode active substance, 5 g of a graphite conductive agent and 3 g of a polyvinylidene fluoride binder are mixed so as to obtain a positive electrode mixture, and the obtained positive electrode mixture is dispersed in 33 g of N-methyl pyrrolidone to obtain a positive electrode mixture slurry. After that, the surfaces of an aluminum foil are coated by the positive electrode mixture slurry to obtain a positive electrode current collector. The positive electrode current collector is dried and a positive electrode piece is formed by using a punch-forming process.

Preparation of Negative Electrode 97 g of graphite powder, 2 g of butadiene styrene rubber, 1 g of carboxymethylcellulose are added into a certain amount of water and stirring is performed to form a negative electrode slurry. After that, the surfaces of a copper foil are uniformly coated by the obtained negative electrode slurry to obtain a negative electrode current collector. The negative electrode current collector is dried and a negative electrode piece is formed by using the punch-forming process.

Assembly of Battery

A CR2016 button battery is assembled in a dry laboratory. The positive electrode piece obtained in the above steps is used as a positive electrode, the negative electrode piece obtained in the above steps is used as a negative electrode, and the electrolyte prepared in Example 1 is used as electrolyte. The positive electrode, the negative electrode and the separator are assembled with a battery case of the button battery. After being assembled, the battery rests for 24 h and to be aged, thereby a lithium cobaltate button battery is obtained.

Example 17

A button battery is prepared similarly to Example 16, a difference is that the electrolyte prepared in Example 2 is used as electrolyte of the button battery prepared in Example 17.

Example 18

A button battery is prepared similarly to Example 16, a difference is that the electrolyte prepared in Example 3 is used as electrolyte of the button battery prepared in Example 18.

Example 19

A button battery is prepared similarly to Example 16, a difference is that the electrolyte prepared in Example 4 is used as electrolyte of the button battery prepared in Example 19.

Example 20

A button battery is prepared similarly to Example 16, a difference is that the electrolyte prepared in Example 5 is used as electrolyte of the button battery prepared in Example 20.

Example 21

A button battery is prepared similarly to Example 16, a difference is that the electrolyte prepared in Example 6 is used as electrolyte of the button battery prepared in Example 21.

Example 22

A button battery is prepared similarly to Example 16, a difference is that the electrolyte prepared in Example 7 is used as electrolyte of the button battery prepared in Example 22.

Example 23

A button battery is prepared similarly to Example 16, a difference is that the electrolyte prepared in Example 8 is used as electrolyte of the button battery prepared in Example 23.

Example 24

A button battery is prepared similarly to Example 16, a difference is that the electrolyte prepared in Example 9 is used as electrolyte of the button battery prepared in Example 24.

Example 25

A button battery is prepared similarly to Example 16, a difference is that the electrolyte prepared in Example 10 is used as electrolyte of the button battery prepared in Example 25.

Example 26

A button battery is prepared similarly to Example 16, a difference is that the electrolyte prepared in Example 11 is used as electrolyte of the button battery prepared in Example 26.

Example 27

A button battery is prepared similarly to Example 16, a difference is that the electrolyte prepared in Example 12 is used as electrolyte of the button battery prepared in Example 27.

Example 28

A button battery is prepared similarly to Example 16, a difference is that the electrolyte prepared in Example 13 is used as electrolyte of the button battery prepared in Example 28.

Example 29

A button battery is prepared similarly to Example 16, a difference is that the electrolyte prepared in Example 14 is used as electrolyte of the button battery prepared in Example 29.

Example 30

A button battery is prepared similarly to Example 16, a difference is that the electrolyte prepared in Example 15 is used as electrolyte of the button battery prepared in Example 30.

Comparative Example 2

A button battery is prepared similarly to Example 16, a difference is that the electrolyte prepared in Comparative Example 1 is used as electrolyte of the button battery prepared in Comparative Example 2.

Test of Battery Performance

Figure 2:
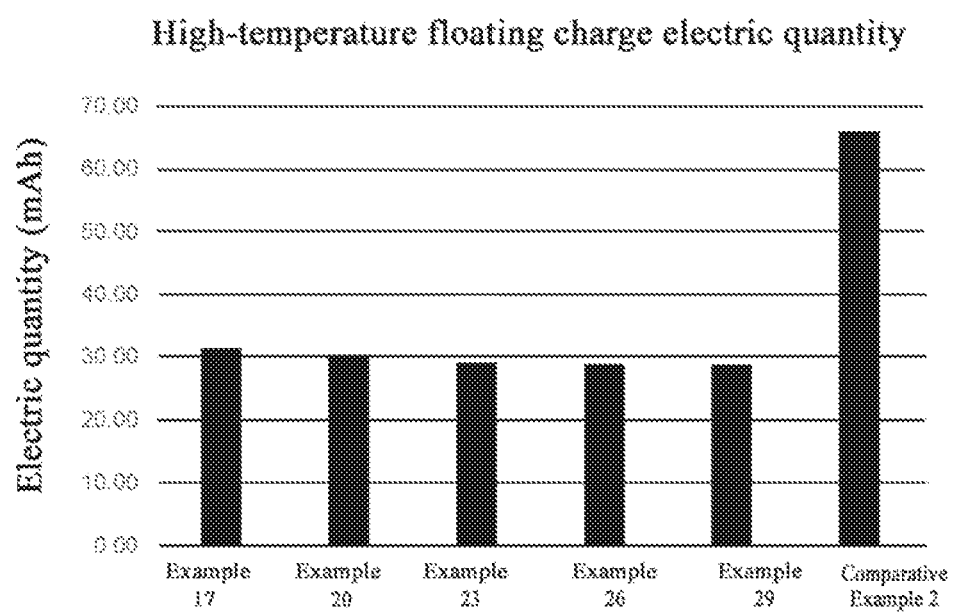
FIG. 2 shows the experimental results of floating charge electric quantity of some examples and comparative example 2.

Firstly, parallel tests of charging-discharging are performed on the button batteries of Examples 16-30 and Comparative Example 2 at room temperature, at a voltage between 3 V and 4.45 V. After that, the batteries are grouped, a 1C cyclic test is performed on one group of the batteries at 45° C. for 60 circles, thereby a capacity retention rate thereof is determined. A floating charge test is performed on the other group of the batteries at 60° C., and a charging voltage is set to be 4.45 V, and a floating charge electric quantity is measured. Experiment results are shown in Table 1, and FIG. 1 and FIG. 2. Wherein, the battery with the larger floating charge electric quantity is poorer in performance.

TABLE 1 battery performance testing results

| Example | Additive types | Addition amount | Cyclic retention rate | Floating charge electric quantity (mAh) |
|---|---|---|---|---|
| Example 16 | N-methyl-morpholine-N-oxide | 0.2% | 73% | 50.71 |
| Example 17 | N-methyl-morpholine-N-oxide | 1.0% | 85% | 31.29 |
| Example 18 | N-methyl-morpholine-N-oxide | 3.0% | 63% | 27.88 |
| Example 19 | N-ethyl-morpholine-N-oxide | 0.2% | 66% | 47.73 |
| Example 20 | N-ethyl-morpholine-N-oxide | 1.0% | 84% | 30.30 |
| Example 21 | N-ethyl-morpholine-N-oxide | 3.0% | 52% | 25.11 |
| Example 22 | N-n-propyl-morpholine-N-oxide | 0.2% | 61% | 38.24 |
| Example 23 | N-n-propyl-morpholine-N-oxide | 1.0% | 81% | 29.00 |
| Example 24 | N-n-propyl-morpholine-N-oxide | 3.0% | 46% | 23.88 |
| Example 25 | N-n-butyl-morpholine-N-oxide | 0.2% | 58% | 37.71 |
| Example 26 | N-n-butyl-morpholine-N-oxide | 1.0% | 81% | 28.83 |
| Example 27 | N-n-butyl-morpholine-N-oxide | 3.0% | 41% | 23.73 |
| Example 28 | N-phenyl-morpholine-N-oxide | 0.2% | 66% | 36.94 |
| Example 29 | N-phenyl-morpholine-N-oxide | 1.0% | 76% | 28.73 |
| Example 30 | N-phenyl-morpholine-N-oxide | 3.0% | 56% | 22.09 |
| Comparative Example 2 | | | 51% | 65.94 |

In Table 1, the "addition amount" is a weight percentage of the additive based on a total weight of the base electrolyte.

It may be observed from the above testing results that the above examples of the present disclosure achieve the following technical effects.

It may be observed from the experiment results that the electrolyte is added with the electrolyte additive with the structural of Formula (1) of the present disclosure, wherein an oxidized morpholine body structure is preferentially reduced to form the membrane on the surfaces of negative electrode, the deposition of the transition metal on the surfaces of the negative electrode and reductive decomposition of the electrolyte are inhibited.

When the addition amount of the electrolyte additive of the present disclosure is excessively low, the membrane formation on the surfaces of the negative electrode is inadequate, and it is difficult to achieve a function of inhibiting the deposition of the transition metal on the surfaces of the negative electrode and the reductive decomposition of the electrolyte. When the addition amount of the electrolyte additive of the present disclosure is excessively high, although dissolution of the transition metal may be inhibited better, because the formed membrane is excessively thick, the battery impedance is increased, thereby the cyclic performance is reduced.

Because lone pair electrons on the nitrogen element are moved in the oxidized morpholine structure in the structural of Formula (1) of the present disclosure, the anti-oxidization of the structure is improved, and more beneficial to the application of the lithium ion battery at high voltage. In addition, it may be observed from the above battery performance testing results that the lithium ion secondary battery containing the electrolyte additive of the present disclosure shows the excellent effects in aspects of high-temperature cyclic stability and high-temperature floating charge electric quantity.

The above descriptions are only the optimal embodiments of the present disclosure, and are not intend to limit the present disclosure, various changes and modifications may be made to the present disclosure by those skilled in the art. Within spirits and principles of the present disclosure, any modifications, equivalent replacements, improvements and the like shall fall within a scope of protection of the present disclosure.

What is claimed is:

1. An electrolyte comprising an organic solvent, a lithium salt and an electrolyte additive, wherein the electrolyte additive has a structure of Formula (1):

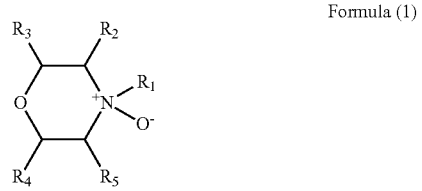

Formula (1)

wherein $R_1$ is hydrogen, a phenyl, a cyano group, an alkyl cyano group or a $C_1$ to $C_6$ alkyl, and
each of $R_2$ to $R_5$ is independently selected from hydrogen or a $C_1$ to $C_6$ alkyl.

2. The electrolyte as claimed in claim 1, wherein the electrolyte additive comprises a compound with a structure of Formula (1):

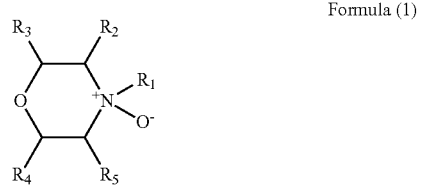

Formula (1)

wherein $R_1$ is hydrogen, a phenyl, a cyano group, a alkyl cyano group or a $C_1$ to $C_6$ alkyl, and
each of $R_2$ to $R_5$ is hydrogen.

3. The electrolyte as claimed in claim 1, wherein the electrolyte additive comprises a compound with a structure of Formula (1):

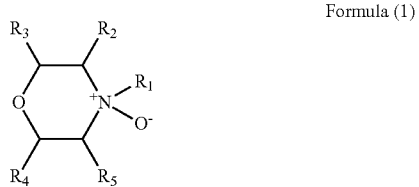

Formula (1)

wherein $R_1$ is a phenyl or a $C_1$ to $C_4$ alkyl, and
each of $R_2$ to $R_5$ is hydrogen.

4. The electrolyte as claimed in claim 1, wherein an amount of the electrolyte additive ranges from about 0.2 to about 3 parts by weight, based on 100 parts by weight of the organic solvent and the lithium salt.

5. The electrolyte as claimed in claim 4, wherein an amount of the organic solvent ranges from about 80 to about 90 parts by weight, based on 100 parts by weight of the organic solvent and the lithium salt.

6. The electrolyte as claimed in claim 4, wherein an amount of the lithium salt ranges from about 10 to about 20 parts by weight, based on 100 parts by weight of the organic solvent and the lithium salt.

7. The electrolyte as claimed in claim 4, wherein the organic solvent is selected from a group consisting of ethylene carbonate, propylene carbonate, butyl carbonate, fluoroethylene carbonate, diethyl carbonate, dipropyl carbonate, ethyl methyl carbonate, carbonic acid ethylene ester, dimethyl carbonate, or any combination thereof.

8. The electrolyte as claimed in claim 4, wherein the lithium salt is selected from a group consisting of LiCl, LiBr, $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, or any combination thereof.

9. The electrolyte as claimed in claim 1, wherein an amount of the organic solvent ranges from about 80 to about 90 parts by weight, based on 100 parts by weight of the organic solvent and the lithium salt.

10. The electrolyte as claimed in claim 1, wherein an amount of the lithium salt ranges from about 10 to about 20 parts by weight, based on 100 parts by weight of the organic solvent and the lithium salt.

11. The electrolyte as claimed in claim 1, wherein the organic solvent is selected from a group consisting of ethylene carbonate, propylene carbonate, butyl carbonate, fluoroethylene carbonate, diethyl carbonate, dipropyl carbonate, ethyl methyl carbonate, carbonic acid ethylene ester, dimethyl carbonate, or any combination thereof.

12. The electrolyte as claimed in claim 1, wherein the lithium salt is selected from a group consisting of LiCl, LiBr, $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, or any combination thereof.

13. A lithium ion secondary battery, wherein the lithium ion secondary battery comprises:
a positive electrode,
a negative electrode,
a separator, and
the electrolyte as claimed in claim 1.

14. The lithium ion secondary battery as claimed in claim 13, wherein an amount of the electrolyte additive in the electrolyte ranges from about 0.2 to about 3 parts by weight, based on 100 parts by weight of the organic solvent and the lithium salt.

15. The lithium ion secondary battery as claimed in claim 13, wherein an amount of the organic solvent in the electrolyte ranges from about 80 to about 90 parts by weight, based on 100 parts by weight of the organic solvent and the lithium salt.

16. The lithium ion secondary battery as claimed in claim 13, wherein an amount of the lithium salt in the electrolyte ranges from about 10 to about 20 parts by weight, based on 100 parts by weight of the organic solvent and the lithium salt.

17. The lithium ion secondary battery as claimed in claim 13, wherein the organic solvent in the electrolyte is selected from a group consisting of ethylene carbonate, propylene carbonate, butyl carbonate, fluoroethylene carbonate, diethyl carbonate, dipropyl carbonate, ethyl methyl carbonate, carbonic acid ethylene ester, dimethyl carbonate, or any combination thereof.

18. The lithium ion secondary battery as claimed in claim 13, wherein the lithium salt in the electrolyte is selected from a group consisting of LiCl, LiBr, $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, or any combination thereof.

* * * * *